(12) United States Patent
Viscardi et al.

(10) Patent No.: US 10,644,624 B1
(45) Date of Patent: May 5, 2020

(54) SYSTEMS AND METHODS FOR BACK ELECTROMOTIVE FORCE BASED FEEDBACK FOR A MOVABLE COMPONENT

(71) Applicant: Johnson Controls Technology Company, Auburn Hills, MI (US)

(72) Inventors: Claudio Viscardi, Casatenovo (IT); Michele Carozzi, Lomagna (IT); Andrea Tamagni, Monza (IT); Mattia Lovati, Santo Stefano Ticino (IT)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/234,001

(22) Filed: Dec. 27, 2018

(51) Int. Cl.
*H02P 6/182* (2016.01)
(52) U.S. Cl.
CPC .......... *H02P 6/182* (2013.01); *H02P 2203/03* (2013.01)
(58) Field of Classification Search
CPC ...... H02P 1/00; H02P 1/04; H02P 1/46; H02P 6/18; H02P 6/00; H02P 1/26; H02P 1/28; H02P 1/18; H02P 1/24; H02P 3/18; H02P 6/002; H02P 6/003; H02P 6/005; H02P 6/006; H02P 6/008; H02P 6/08; H02P 6/182; H02P 8/00; H02P 8/005; H02P 8/22; H02P 21/00; H02P 21/0035; H02P 23/00; H02P 27/00; H02P 27/04; H02P 27/06; H02P 25/06
USPC ....... 388/928.1; 318/400.34, 400.01, 400.14, 318/400.32, 400.15, 700, 701, 721, 799, 318/800, 801, 430, 432; 702/64, 80
See application file for complete search history.

(56) References Cited

U.S. PATENT DOCUMENTS

| | | | |
|---|---|---|---|
| 5,306,988 A | 4/1994 | Carobolante et al. |
| 5,481,167 A | 1/1996 | Rohrbaugh et al. |
| 5,554,916 A | 9/1996 | Kaneda et al. |
| 5,672,948 A | 9/1997 | Cohen et al. |
| 5,767,654 A | 6/1998 | Menegoli et al. |
| 5,789,895 A | 8/1998 | Lee |
| 5,982,133 A | 11/1999 | Murakami et al. |
| 6,017,143 A | 1/2000 | Eryurek et al. |
| 6,034,493 A | 3/2000 | Boyd et al. |
| 6,040,671 A | 3/2000 | Brito et al. |
| 6,198,243 B1 | 3/2001 | Ritmanich et al. |
| 6,269,784 B1 | 8/2001 | Newton |
| 6,686,714 B2 | 2/2004 | Trifilo |
| 7,235,939 B2 | 6/2007 | Viti |

(Continued)

*Primary Examiner* — Antony M Paul
(74) *Attorney, Agent, or Firm* — Foley & Lardner LLP

(57) ABSTRACT

Systems and methods for controlling a movable component using back electromotive force (BEMF)-based feedback are described. The system includes an actuator operatively coupled to the movable component. The actuator includes a motor for driving the movable component. The actuator includes a BEMF circuit for measuring a BEMF produced by the motor while driving the movable component. The system includes a processing circuit communicably coupled to the motor and the BEMF circuit. The processing circuit receives, from the BEMF circuit, a BEMF signal generated by the BEMF circuit as the motor drives the movable component. The processing circuit determines, based on the BEMF signal, an active range of the motor which corresponds to a full stroke of the movable component. The processing circuit controls the motor to drive the movable component within the active range.

20 Claims, 10 Drawing Sheets

(56) References Cited

U.S. PATENT DOCUMENTS

| | | | |
|---|---|---|---|
| 7,514,894 B2 | 4/2009 | Hoogzaad | |
| 8,022,646 B1 | 9/2011 | Sutardja et al. | |
| 8,169,178 B2 | 5/2012 | Letor et al. | |
| 8,473,229 B2* | 6/2013 | Kucera | G01R 31/392 702/58 |
| 8,588,983 B2* | 11/2013 | Grabinger | F24F 13/1426 700/276 |
| 8,972,064 B2* | 3/2015 | Grabinger | F24F 13/1426 700/276 |
| 9,509,243 B2 | 11/2016 | Viscardi et al. | |
| 2013/0116832 A1* | 5/2013 | Grabinger | F24F 11/70 700/276 |
| 2015/0362236 A1* | 12/2015 | Jiang | F25B 41/062 137/12 |

* cited by examiner

SYSTEMS AND METHODS FOR BACK ELECTROMOTIVE FORCE BASED FEEDBACK FOR A MOVABLE COMPONENT

BACKGROUND

The present disclosure relates generally to actuators in various building systems and more particularly to using back electromotive force as feedback for controlling actuators.

Actuators are used to operate a wide variety of HVAC (and other building system) components, such as air dampers, fluid valves, air handling units, and other components that are typically used in HVAC systems. For example, an actuator may be coupled to a damper in an HVAC system and may be used to drive the damper between an open position and a closed position. An actuator typically includes a motor and a drive device (e.g., a hub, a drive train, etc.) that is driven by the motor and coupled to a movable component.

Each movable component and motor may be manufactured to a degree of tolerance. As such, it may be difficult to accurately control the motor for driving the movable component.

SUMMARY

One implementation of the present disclosure is a system for controlling a movable component in a building system using back electromotive force-based feedback. The system includes an actuator operatively coupled to the movable component. The actuator includes a motor configured to drive the movable component. The actuator includes a back electromotive force (BEMF) circuit configured to measure a BEMF produced by the motor while driving the movable component. The system includes a processing circuit communicably coupled to the motor and the BEMF circuit. The processing circuit includes a processor and memory. The memory stores instructions that, when executed by the processor, cause the processor to perform operations. The operations include receiving, from the BEMF circuit, a BEMF signal generated by the BEMF circuit as the motor drives the movable component. The operations include determining, based on the BEMF signal, an active range of the motor which corresponds to a full stroke of the movable component. The operations include controlling the motor to drive the movable component within the active range.

In some embodiments, determining the active range includes identifying a first end point corresponding to a position of the motor as the motor begins to drive the movable component. Determining the active range may further include identifying a second end point based on a comparison of a mean BEMF to a sampled BEMF at the second end point. Determining the active range may further include determining the active range, the active range being defined as spanning between the first end point and the second end point.

In some embodiments, identifying the first end point includes identifying a hard stall position corresponding to the motor. The hard stall position may be defined as a position in which the BEMF signal indicates zero BEMF.

In some embodiments, identifying the first end point includes identifying a soft stall position corresponding to the motor. The soft stall position may be defined as a position in which the BEMF signal indicates a BEMF value between zero and a threshold BEMF value.

In some embodiments, the active range of the motor is equal to the full stroke of the movable component.

In some embodiments, the motor has a range of motion larger than the active range of the motor.

In some embodiments, the operations further include identifying, while controlling the motor to drive the movable component within the active range, a BEMF value which is less than an expected BEMF value corresponding to a profile for the motor. The operations may further include determining, based on the BEMF value being less than the expected BEMF value, that a sticking condition is present for the movable component. The operations may further include generating a signal corresponding to an alert for communication to an operator which indicates the sticking condition.

Another implementation of the present disclosure is an actuator. The actuator includes a motor configured to drive a movable component configured to control one or more aspects of a system in a building. The actuator includes a back electromotive force (BEMF) circuit configured to measure a BEMF produced by the motor while driving the movable component. The actuator includes a processing circuit communicably coupled to the motor and the BEMF circuit. The processing circuit includes a processor and memory. The memory stores instructions that, when executed by the processor, cause the processor to perform operations. The operations include receiving, from a back electromotive force (BEMF) circuit, a BEMF signal generated by the BEMF circuit as the motor drives the movable component. The operations include determining, based on the BEMF signal, an active range of the motor which corresponds to a full stroke of the movable component. The operations include controlling the motor to drive the movable component within the active range.

In some embodiments, determining the active range includes identifying a first end point corresponding to a position of the motor as the motor begins to drive the movable component. Determining the active range may further include identifying a second end point based on a comparison of a mean BEMF to a sampled BEMF at the second end point. Determining the active range may further include determining the active range, the active range being defined as spanning between the first end point and the second end point.

In some embodiments, identifying the first end point includes identifying a hard stall position corresponding to the motor. The hard stall position may be defined as a position in which the BEMF signal indicates zero BEMF.

In some embodiments, identifying the first end point includes identifying a soft stall position corresponding to the motor. The soft stall position may be defined as a position in which the BEMF signal indicates a BEMF value between zero and a threshold BEMF value.

In some embodiments, the active range of the motor is equal to the full stroke of the movable component.

In some embodiments, the motor has a range of motion larger than the active range of the motor.

In some embodiments, the operations further include identifying, while controlling the motor to drive the movable component within the active range, a BEMF value which is less than an expected BEMF value corresponding to a profile for the motor. The operations may further include determining, based on the BEMF value being less than the expected BEMF value, that a sticking condition is present for the movable component. The operations may further include generating a signal corresponding to an alert for communication to an operator which indicates the sticking condition.

Another implementation of the present disclosure is a method for back electromotive force-based feedback. The method includes receiving, from a back electromotive force (BEMF) circuit configured to measure a BEMF produced by a motor while a motor drives a movable component configured to control one or more aspects of a system in a building, a BEMF signal generated by the BEMF circuit as the motor drives the movable component. The method includes determining, based on the BEMF signal, an active range of the motor which corresponds to a full stroke of the movable component. The method includes controlling the motor to drive the movable component within the active range.

In some embodiments, determining the active range includes identifying a first end point corresponding to a position of the motor as the motor begins to drive the movable component. Determining the active range may further include identifying a second end point based on a comparison of a mean BEMF to a sampled BEMF at the second end point. Determining the active range may further include determining the active range, the active range being defined as spanning between the first end point and the second end point.

In some embodiments, identifying the first end point includes identifying one of a hard stall position and a soft stall position corresponding to the motor. The hard stall position may be defined as a position in which the BEMF signal indicates zero BEMF. The soft stall position may be defined as a position in which the BEMF signal indicates a BEMF value between zero and a threshold BEMF value.

In some embodiments, the active range of the motor is equal to the full stroke of the movable component.

In some embodiments, the motor has a range of motion larger than the active range of the motor.

In some embodiments, the method further includes identifying, while controlling the motor to drive the movable component within the active range, a BEMF value which is less than an expected BEMF value corresponding to a profile for the motor. The method may further include determining, based on the BEMF value being less than the expected BEMF value, that a sticking condition is present for the movable component. The method may further include generating a signal corresponding to an alert for communication to an operator which indicates the sticking condition.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Referring generally to the FIGURES, systems and methods for back electromotive force (BEMF)-based feedback for a movable component are shown, according to exemplary embodiments. The systems and methods described herein may measure BEMF from a motor of an actuator which drives the movable component. The actuator may be a damper actuator, a valve actuator, a fan actuator, a pump actuator, or any other type of actuator that can be used in an HVAC or other system.

The system includes a movable component configured to control one or more aspects of a system in a building. The system includes an actuator operatively coupled to the movable component. The actuator includes a motor configured to drive the movable component. The actuator includes a back electromotive force (BEMF) circuit configured to measure a BEMF produced by the motor while driving the movable component. The system includes a processing circuit communicably coupled to the motor and the BEMF circuit. The processing circuit receives, from the BEMF circuit, a BEMF signal generated by the BEMF circuit as the motor drives the movable component. The processing circuit determines, based on the BEMF signal, an active range of the motor which corresponds to a full stroke of the movable component. The processing circuit controls the motor to drive the movable component within the active range.

The aspects described herein may increase the reliability of actuators. For instance, by understanding the active range of a motor for an actuator which drives the movable component, the motor may be more finely, reliably, and precisely controlled. By using BEMF, limited modifications of actuators may be required, thus reducing costs corresponding to testing of the actuators. Furthermore, by using BEMF, various conditions of the actuator and/or movable component may be detected, thus mitigating the likelihood of any unplanned interruptions due to faults of movable devices within a building system or subsystem. Various other benefits will become apparent based on the description that follows.

Building Management System and HVAC System

Figure 1:
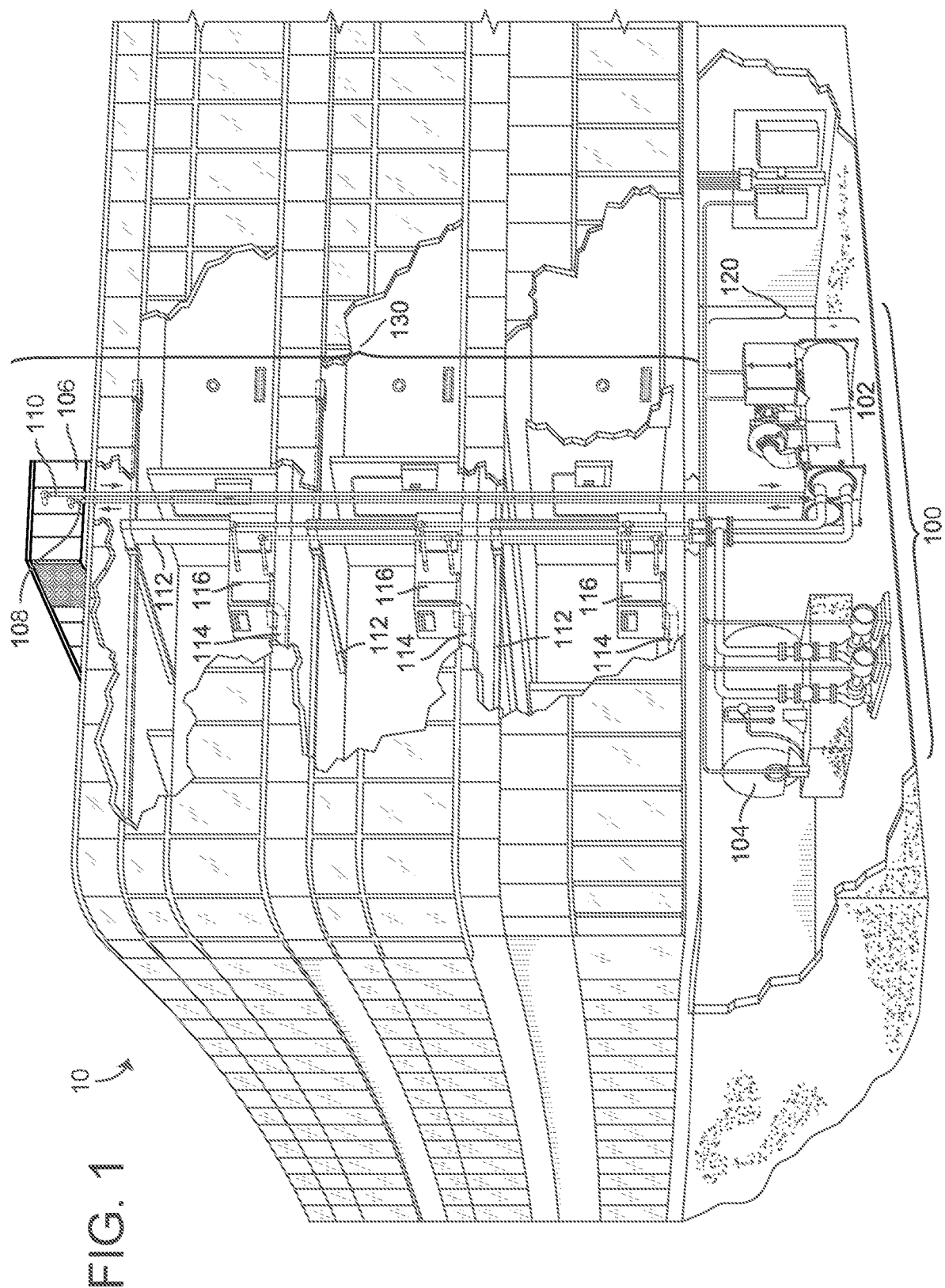
FIG. 1 is a drawing of a building equipped with a heating, ventilating, or air conditioning (HVAC) system and a building management system (BMS), according to an exemplary embodiment.

Referring now to FIGS. 1-4, an exemplary building management system (BMS) and HVAC system in which the systems and methods of the present disclosure may be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, an HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve set point conditions for the building zone.

Figure 2:
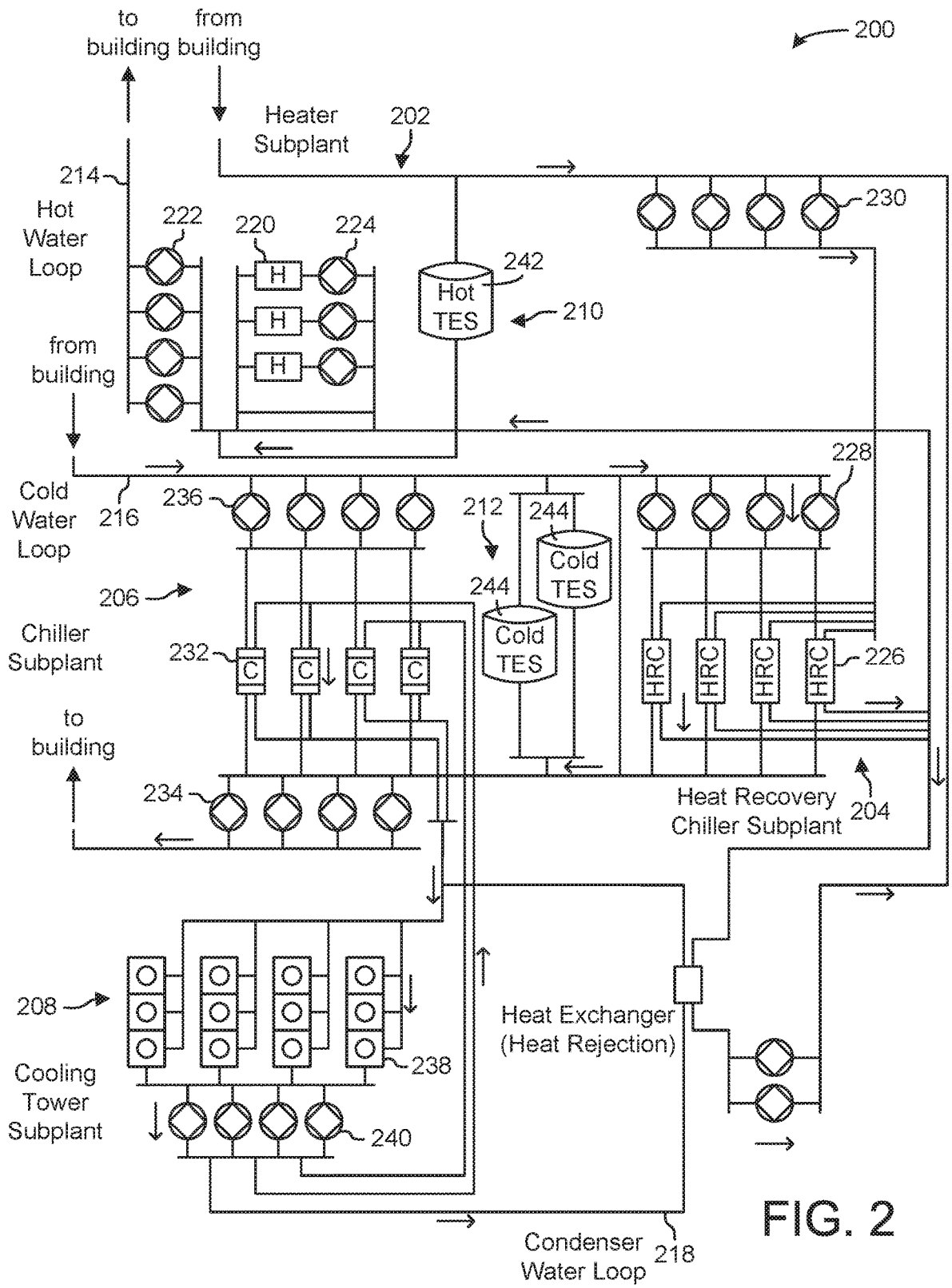
FIG. 2 is a schematic diagram of a waterside system which may be used to support the HVAC system of FIG. 1, according to an exemplary embodiment.

Referring now to FIG. 2, a block diagram of a waterside system 200 is shown, according to an exemplary embodiment. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 and building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) may be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
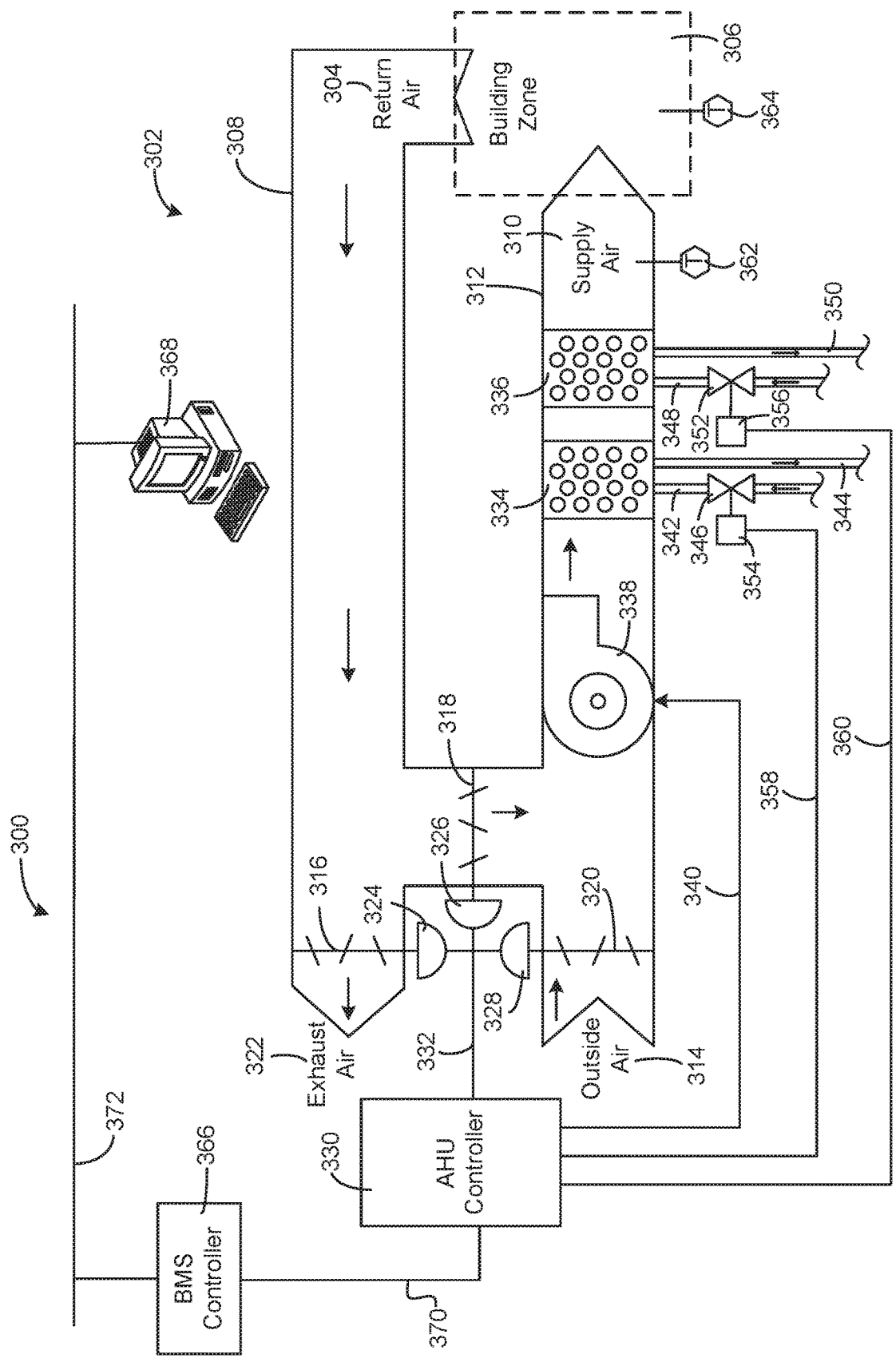
FIG. 3 is a block diagram of an airside system which may be used as part of the HVAC system of FIG. 1, according to an exemplary embodiment.

Referring now to FIG. 3, a block diagram of an airside system 300 is shown, according to an exemplary embodiment. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type AHU 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a BMS controller 366 and a client device 368. BMS controller 366 may include one or more computer systems (e.g., servers, supervisory controllers, subsystem controllers, etc.) that serve as system-level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
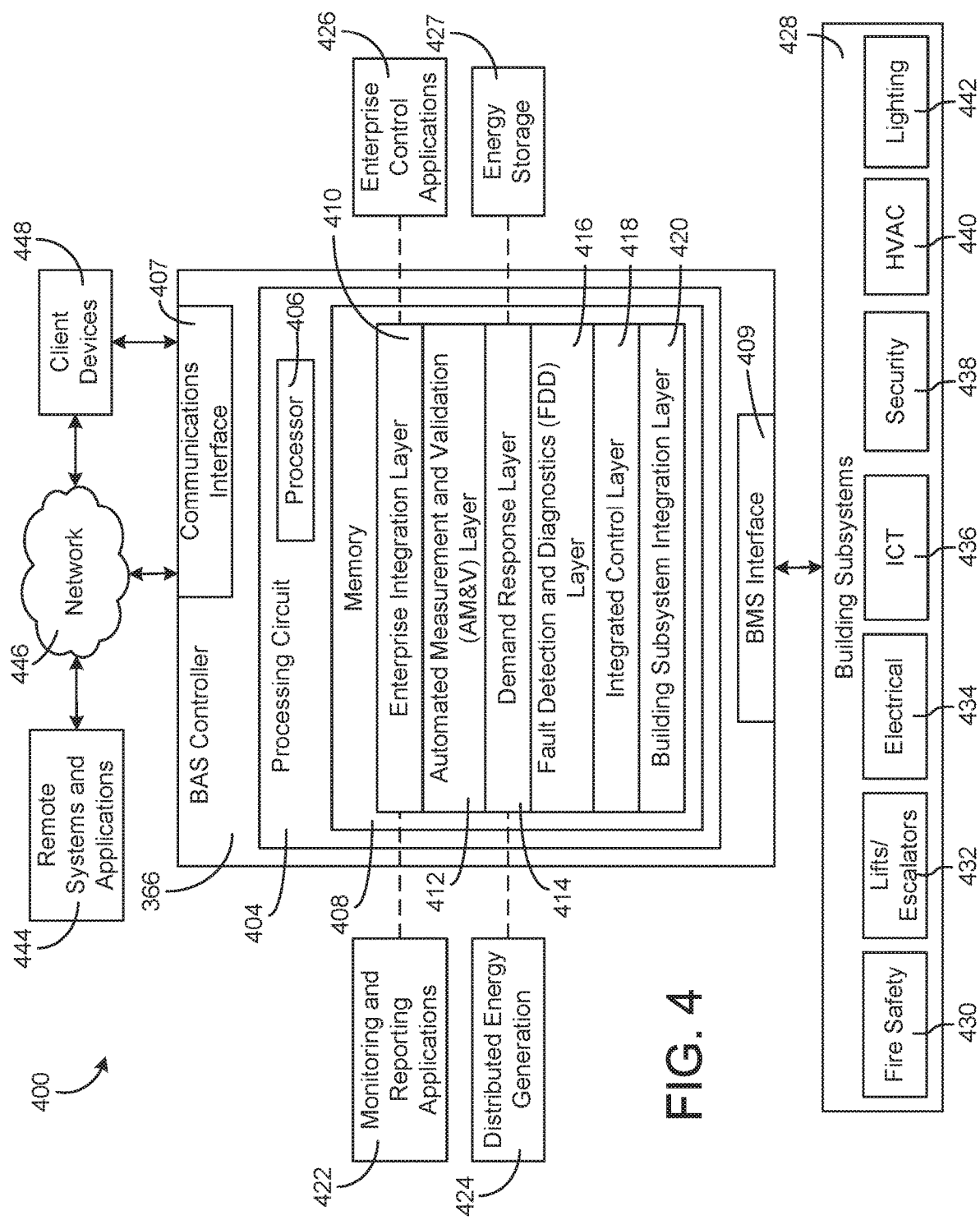
FIG. 4 is a block diagram of a BMS which may be implemented in the building of FIG. 1, according to an exemplary embodiment.

Referring now to FIG. 4, a block diagram of a BMS 400 is shown, according to an exemplary embodiment. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include any number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407 and 409 may be or may include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407 and 409 may be direct (e.g., local wired or wireless communications) or via a communications network 446 (e.g., a WAN, the Internet, a cellular network, etc.). For example, interfaces 407 and 409 may include an Ethernet card and port for sending and receiving data via an Ethernet-based communications link or network. In another example, interfaces 407 and 409 may include a Wi-Fi transceiver for communicating via a wireless communications network. In another example, one or both of interfaces 407 and 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407 and 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 408 may be or include volatile memory or non-volatile memory. Memory 408 may include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments, BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translates communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Systems and Methods for BEMF-Based Feedback for a Movable Component

Figure 5:
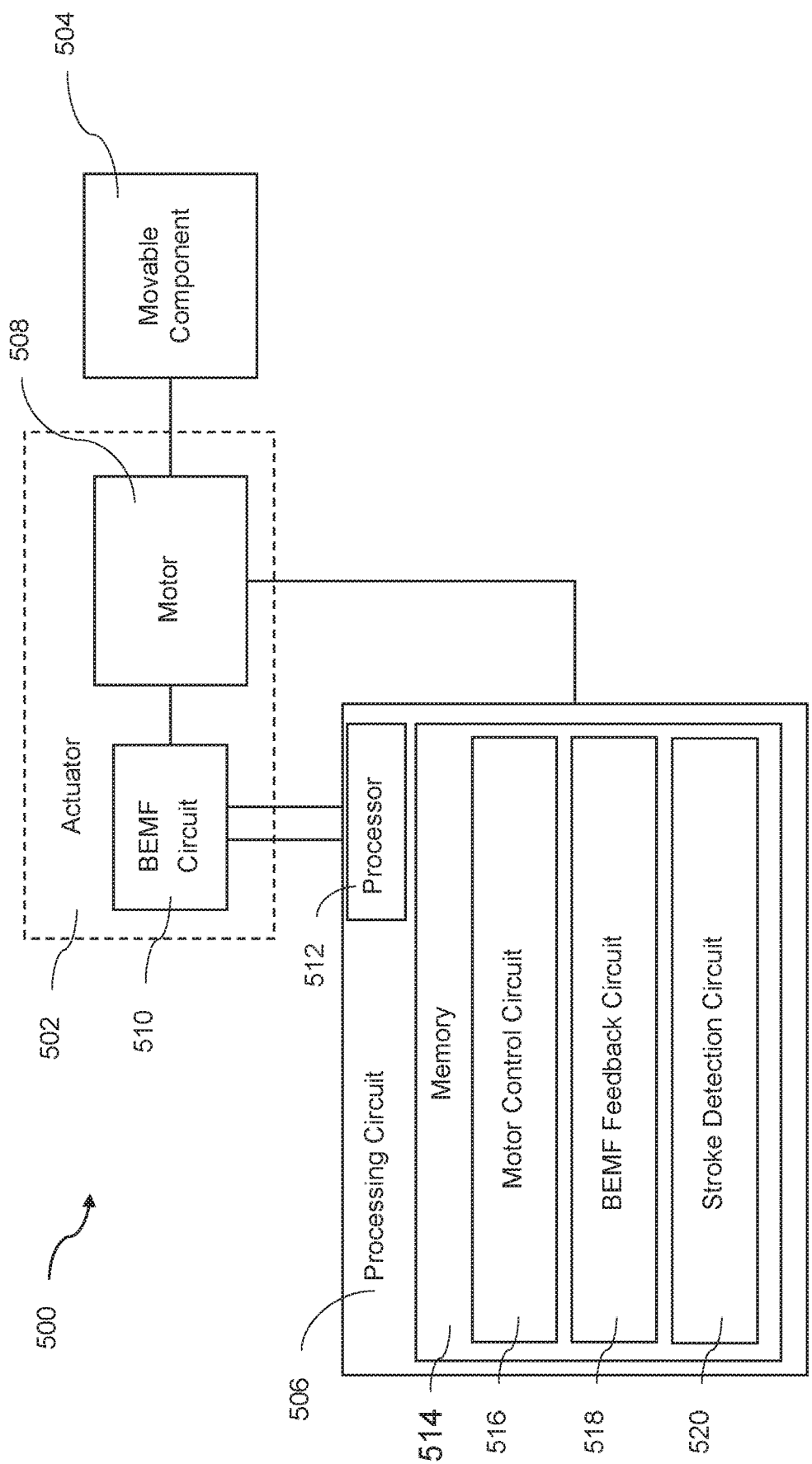
FIG. 5 is a block diagram of a system for back electromotive force (BEMF)-based feedback for a movable component in a building subsystem, such as a subsystem in the BMS of FIG. 4, according to an exemplary embodiment.

Referring now to FIG. 5, depicted is a block diagram of a system 500 for back electromotive force (BEMF)-based feedback for a movable component, according to an exemplary embodiment. The system is shown to include an actuator 502, a movable component 504, and a processing circuit 506. The actuator 502 may be used in various systems or subsystems a building 10, including, for instance, the HVAC system 100, waterside system 120, one of the building subsystems 428 which is controlled by the BMS controller 366, and so forth. The actuator 502 may be a damper actuator, a valve actuator, a fan actuator, a pump actuator, or any other type of actuator that may be used in one of the aforementioned systems or subsystems. In various embodiments, the actuator 502 may be a linear actuator (e.g., a linear proportional actuator), a non-linear actuator, a spring return actuator, or a non-spring return actuator.

The actuator 502 includes a motor 508. The motor 508 is configured to provide a force to one or more movable components 504. For instance, the motor 508 may drive a damper, a valve, a fan, a pump, etc. In some embodiments, the motor 508 is a stepper motor. The motor 508 may rotate in predetermined steps within a range of motion for the motor 508. For instance, a full rotation of a rotor for the motor 508 may be divided into a number of steps. From an initial position, the motor 508 may rotate in the predetermined steps towards a full rotation. Where the stepper motor 508 rotates the full number of steps, the motor 508 will have completed a full rotation. Such embodiments permit precise movement and control of the motor 508 and, therefore, the output(s) or movable components 504 which stepper motor 508 is driving.

The movable component 504 may have a range of motion corresponding to a full stroke of the movable component 504. As one example, where the movable component 504 is a valve, the range of motion may be defined by a position of the valve when the valve is fully open and a position of the valve when the valve is fully closed. The motor 508 of the actuator 502 may be configured to move the movable component 504 within the range of motion of the movable component 504. For instance, the motor 508 may be configured to perform a full stroke of the movable component 504. In some embodiments, the motor 508 may have a range of motion that is greater than the range of motion than the movable component 504. In some embodiments, the motor 508 may have a range of motion that is the same as (or substantially the same as) the range of motion of the movable component 504. In each of these embodiments, the motor 508 may be configured to drive the movable component 504 across the movable component's 504 full range of motion. In embodiments where the motor 508 has a range of motion that is greater than the range of motion of the movable component 504, the difference between range of motions may correspond to, for instance, dead space of the movable component 504, a difference in a starting position of a stem of the movable component 504 which contacts the actuator 502 and an armature of the motor 508 of the actuator 502, mechanical tolerances, variances in construction or manufacture of the movable component 504, and so forth. Each of these examples may cause the motor 508 to rotate outside of the range of motion of the movable component 504. As described in greater detail below, the embodiments described herein may be configured to determine the full range of motion of the movable component 504. Such embodiments may provide for more effective and accurate control of the movable component 504 via the actuator 502.

The actuator 502 is shown to include a back electromotive force (BEMF) circuit 510. The BEMF circuit 510 may be designed or implemented to measure, sense, or otherwise detect a BEMF value or signal corresponding to the motor 508. The BEMF circuit 510 may be configured to measure BEMF across windings for the motor 508. As a rotor of the motor 508 rotates between the windings, the rotor may induce a current flowing through the windings which opposes the voltage that drives the motor 508. The induced current may increase in proportion to resistive forces of the movable component 504. For instance, where the movable component 504 has a greater weight, the induced current may increase. The induced current is also referred to as BEMF. The BEMF circuit 510 may generally be configured to measure the BEMF produced at the various windings of the motor 508.

Figure 6:
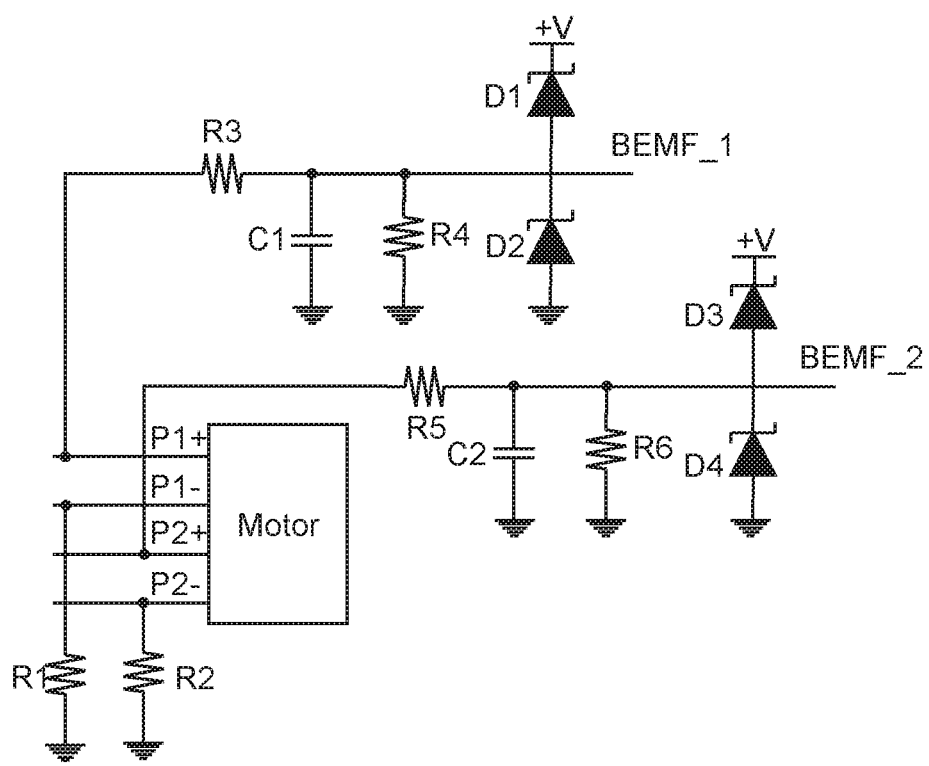
FIG. 6 is an example circuit diagram of a BEMF circuit which may be used in the system of FIG. 5, according to an exemplary embodiment.

Referring to FIG. 6, depicted is an example circuit diagram of a BEMF circuit 510 which may be used in the system 500, according to an exemplary embodiment. The BEMF circuit 510 is shown to include the motor 508. The motor 508 shown in FIG. 6 includes two sets of windings P1 and P2. The BEMF circuit 510 is shown to include nodes which measure BEMF across each of the sets of windings P1 and P2. Referring specifically to winding P1, the positive lead is coupled to BEMF_1, and the negative lead is coupled to ground. Similarly, for winding P2, the positive lead is coupled to BEMF_2, and the negative lead is coupled to ground. In some embodiments, the negative leads may include resistors R1 and R2 which prevent shorts to ground.

The positive lead for winding P1 may include a resistor R3 and capacitor C1 in parallel with a resistor R4. The capacitor C1 and resistor R4 may extend in parallel between BEMF_1 and ground. Resistor R3 may extend between the positive lead and BEMF_1. The resistors R3 and R4 and capacitor C1 may act to filter BEMF measured across the first winding P1. The positive lead of the first winding P1 may also include diodes D1 and D2 arranged to prevent overvoltage of BEMF_1.

Similarly, the positive lead for winding P2 may include a resistor R5 and capacitor C2 in parallel with a resistor R6. The capacitor C2 and resistor R6 may extend in parallel between BEMF_2 and ground. Resistor R5 may extend between the positive lead for winding P2 and BEMF_2. The resistors R5 and R6 and capacitor C2 may act to filter BEMF measured across the second winding P2. The positive lead of the second winding P2 may also include diodes D3 and D4 arranged to prevent overvoltage of BEMF_2.

In operation, as the motor 508 is driven, BEMF may be detected across the windings P1 and P2. The BEMF generated by the motor 508 may be output from the BEMF circuit 510, with BEMF_1 corresponding to the first winding P1 and BEMF_2 corresponding to the second winding P2. While two windings are shown for the motor 508, it should be understood that the circuit 510 may be modified or adapted according to the configuration of the motor 508. Hence, the BEMF circuit 510 may be configured to measure BEMF produced by a variety of different motors. Furthermore, the example circuit diagram shown in FIG. 6 is one example of a circuit diagram for measuring BEMF produced by a motor 510. The circuit diagram may be modified or changed in a number of different ways. Accordingly, the present disclosure is not limited to the specific arrangements depicted in FIG. 6.

The processing circuit 506 is shown to include a processor 512 and memory 514. The processing circuit 506 may be similar in some aspects to processing circuit 404. For instance, processor 512 and memory 514 may be the same as (or a part of) processor 406 and memory 408, respectively. In other embodiments, processing circuit 506 may be separate from processing circuit 404. Accordingly, processor 512 and memory 514 may be different from processor 406 and memory 408, respectively. In still other embodiments, portions of the processing circuit 506 may be located remotely from actuator 502 (for instance, processor 512 may be a part of processor 406, or memory 514 may be a part of memory 408, etc.). In embodiments such as those shown in FIG. 5, the processing circuit 506 may be separate from but communicably coupled to the actuator 502. In still other embodiments, the processing circuit 506 may be embodied on or otherwise incorporated into the actuator 502.

The processor 512 may be implemented as a general purpose processor, an ASIC, one or more FPGAs, a group of processing components, or other suitable electronic processing components. Additionally, memory 514 (e.g., memory, memory unit, storage device, etc.) may include one or more devices (e.g., RAM, ROM, Flash memory, hard disk storage, etc.) for storing data and/or computer code for completing or facilitating the various processes, layers, and modules described in the present application. Memory 514 may be or include volatile memory or non-volatile memory. Memory 514 may include database components, object code components, script components, or any other type of information structure for supporting the various activities and information structures described in the present application. According to an exemplary embodiment, memory 514 is communicably connected to processor 512 via processing circuit 506 and includes computer code for executing (e.g., by processing circuit and/or processor) one or more processes described herein.

The processing circuit 506 is shown to include various circuits. The various circuits may be or include, for instance, computer code, instructions, a combination of hardware (e.g., computing devices, processors, memory, and so forth) and software configured to perform dedicated functions. The processing circuit 506 is shown to include a motor control circuit 516, a BEMF feedback circuit 518, and a stroke detection circuit 520. Generally speaking, the motor control circuit 516 may be configured to control the motor 508 of the actuator 502. The BEMF feedback circuit 518 may be configured to identify BEMF detected via the BEMF circuit 510. The BEMF feedback circuit 518 may be configured to use the BEMF from the BEMF circuit 510 to detect various conditions corresponding to the motor 508/movable component 504. The stroke detection circuit 520 may be configured to detect a full stroke of the movable component based on the measured BEMF detected by BEMF circuit 510. Such circuits together may provide for or improve the controllability of the actuator 502 by accurately determining the end points of the stroke for the movable component 504. By accurately determining the end points of the stroke for the movable component 504, the motor control circuit 516 may more precisely control the movably component 504 within the range of motion defined by the end points of the stroke. While these circuits are shown as separate, in some embodiments, some of these circuits may be combined to form a single circuit. Further, some circuits may be separated into sub-circuits or separate circuits. In some embodiments, some of the circuits may be embodied on or incorporated into separate devices from other circuits.

The memory 514 may store a motor control circuit 516. The motor control circuit 516 may include any device(s) or component(s) configured to control the motor 508 of the actuator 502. The motor control circuit 516 may be configured to communicate signals to the motor 508 to drive the motor 508. For instance, the motor control circuit 516 may be configured to communicate a Pulse Width Modulated (PWM) signal to the motor 508 which causes the motor 508 to rotate in a direction based on the PWM signal. As described above, the motor 508 may, in turn, drive the movable component 504. Hence, the motor control circuit 516 may be configured to drive the movable component 504 by driving the motor 508 of the actuator 502 which drives the movable component 504.

In some embodiments, the motor control circuit 516 may be configured to drive the motor 508 for calibrating the actuator 502. The motor control circuit 516 may drive the motor 508 in a sequence for calibrating the actuator 502. The motor control circuit 516 may be configured to drive the motor 508 for calibrating the actuator 502 when the actuator 502 is installed or registered with a building system (such as the BMS controller 366, for instance). The motor control circuit 516 may be configured to periodically drive the motor 508 for calibrating the actuator 502. For instance, the motor control circuit 516 may drive the motor 508 for calibrating the actuator 502 once a week, once a month, once a year, etc.

The BEMF feedback circuit 518 may include any device(s) or component(s) configured to quantify, measure, sense, or otherwise detect BEMF based on the signals received from the BEMF circuit 510. The BEMF feedback circuit 518 may be configured to plot, map, or otherwise quantify the BEMF over time as the BEMF signals are received from the BEMF circuit 510. In this regard, the BEMF circuit 510 may be configured to generate signals measuring BEMF from the motor 508, and the BEMF feedback circuit 510 may use the signals to quantify the BEMF over time. The BEMF feedback circuit 518 may be configured to identify various characteristics of the motor 508 based on the BEMF over time. The BEMF circuit 518 may, for instance, identify end points of stroke for the motor 508, end points of the stroke for the movable component 504, sticking error conditions for the motor 508 and/or movable component 504, and so forth.

The stroke detection circuit 502 may include any device(s) or component(s) configured to detect a stroke of the motor 508 and/or a stroke of the movable component 504. Stroke, as used herein, refers to movement of a component across the component's full range of motion. As one example, a valve may stroke when the valve moves from a fully open position to a fully closed position. A motor 508 may stroke when the motor rotates its maximum allowable angular rotation from a starting position. As briefly described above, in some embodiments, the motor 508 may have a stroke which is larger (e.g., a larger range of motion) than the stroke of the movable component 504. In some embodiments, the motor 508 may have a stroke which is substantially the same as the stroke of the movable component 504. In each of these embodiments, the stroke of the movable component 504 may be within the stroke of the motor 508. During a stroke of the motor 508, at least a portion of the movement for the motor 508 may actively move the movable component 504. Hence, the motor 508 may include an active range within a stroke for the motor 508 within which the motor 508 controls (or drives) the movable component 504.

Figure 7:
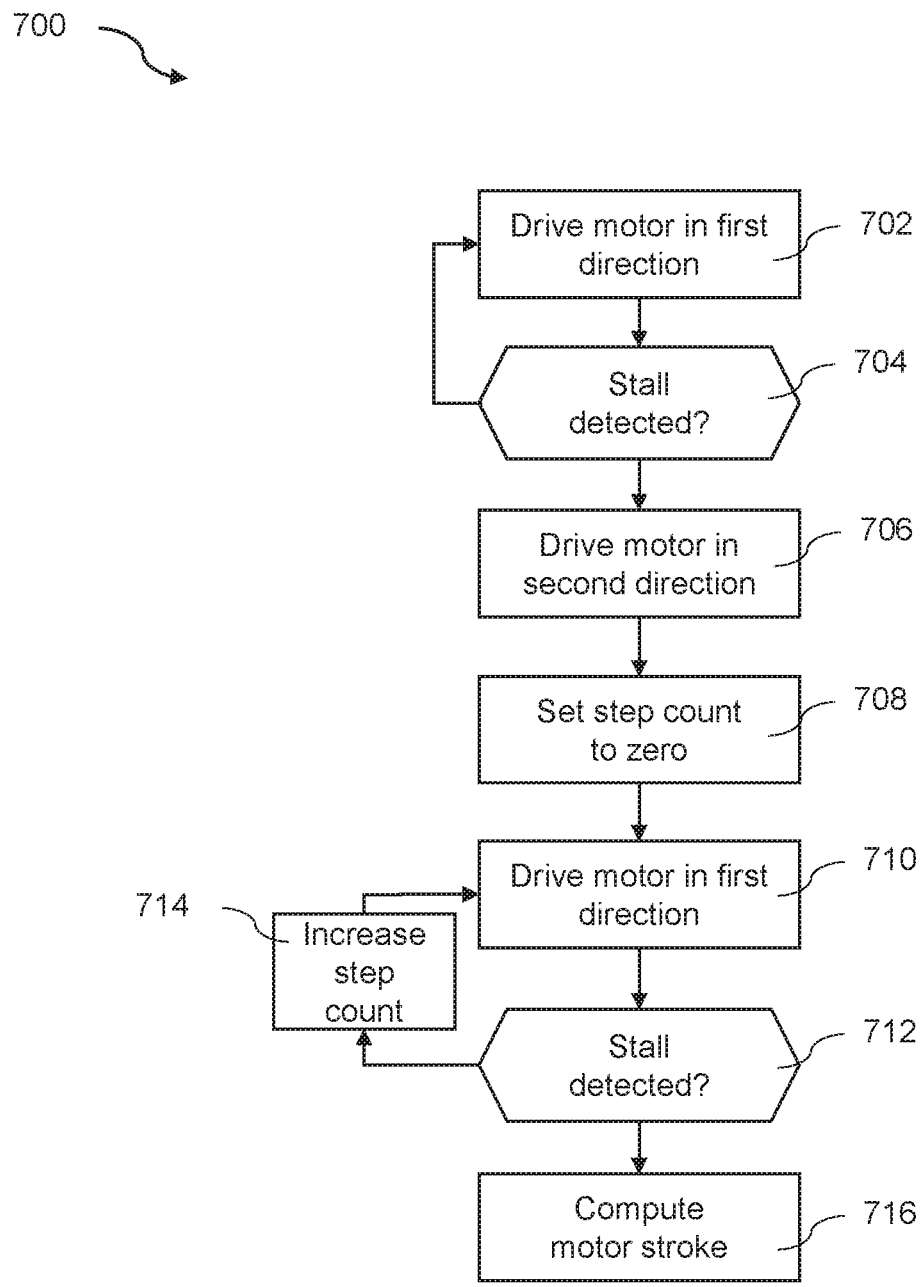
FIG. 7 is a flowchart of a process for detecting a stroke of a motor, according to an exemplary embodiment.

Referring to FIG. 7, depicted is a flowchart of a process 700 for detecting a stroke of the motor 508, according to an exemplary embodiment. The process 700 may be performed by the various components and devices described above with reference to FIG. 5 and FIG. 6.

At operation 702, the motor control circuit 516 drives the motor 508 in a first direction. The first direction may be a clockwise direction, counterclockwise direction, etc. The motor control circuit 516 may communicate a motor control signal to the motor 508 to drive the motor in the first direction. The motor control circuit 516 may drive the motor 508 in steps.

At operation 704, the BEMF feedback circuit 518 determines whether a stall has been detected. The BEMF feedback circuit 518 may determine whether a stall has been detected based on signals corresponding to BEMF detected and generated by the BEMF circuit 510. The BEMF circuit 510 may detect both hard and soft stalls. A hard stall may be or include an instance where the BEMF signal from the BEMF circuit 510 indicates a zero BEMF value. The hard stall may be a result of the motor 508 being stopped. Where the motor 508 is stopped, the armature of the motor 508 does not rotate with respect to the windings and therefore does not generate a current that counters the electromotive force corresponding to the motor control signal from the motor control circuit 516. A soft stall may be or include an instance where the BEMF signal from the BEMF circuit 510 is less than a threshold. The threshold may correspond to a value of BEMF where a certain load is opposed to the motor 508 (indicating the motor 508 has reached a stall position). The BEMF feedback circuit 518 may receive BEMF signals from the BEMF circuit 510 and detect stalls of the motor 508. Where the BEMF feedback circuit 518 does not detect a hard or soft stall, the process 700 may proceed back to operation 702. Thus, the motor control circuit 516 may drive the motor 508 in the first direction until a stall is detected by the BEMF feedback circuit 518. When the BEMF feedback circuit 518 detects a stall of the motor 508, the process 700 may proceed to operation 706.

At operation 706, the motor control circuit 516 drives the motor 508 in a second direction. The second direction may be opposite the first direction (e.g., in operation 702). The motor 508 may thus move from a first position (e.g., where the motor 508 was positioned when the BEMF feedback circuit 516 detected the stall at operation 704) in the second direction. Operation 706 may be similar in some aspects to operation 702 (though, movement in the opposite direction).

The motor control circuit 516 may drive the motor 508 a predetermined distance from the first position in the second direction. The predetermined distance may correspond to a preset stroke for the motor 508. The preset stroke may be, for instance, a stroke which is preset for the motor (e.g., by a manufacturer). In some embodiments, the predetermined distance may be greater than the preset stroke. For instance, some motors 508 may be configured to move beyond their preset stroke. In implementations where the predetermined distance is greater than the preset stroke, the motor control circuit 516 may be configured to move, for instance, the preset stroke and an extra stroke, an extra number of steps, and so forth. Such implementations ensure that the motor 508 is moved to the end of the motor's 508 full range of motion. In each of these embodiments, the motor control circuit 516 may drive the motor 508 to an end of the motor's 508 range of motion in the second direction.

At operation 708, the stroke detection circuit 520 sets the step count for the motor 508 to zero. Hence, the motor 508 is positioned at one end (or extreme) of a range of motion for the motor 508, and the step count is set to zero at that end of the range of motion.

At operation 710, the motor control circuit 516 drives the motor in the first direction (e.g., away from the end in which the motor 508 is positioned at operation 708). The motor control circuit 516 may drive the motor 508 step-by-step. The motor control circuit 516 may drive the motor 508 half-step-by-half-step. In each implementation, the motor control circuit 516 incrementally drives the motor 508 from the end in which the motor 508 is positioned at operation 708 in the first direction.

At operation 712, the BEMF feedback circuit 518 determines whether a stall has been detected. Operation 712 may be similar in at least some aspects as operation 704. Hence, the BEMF feedback circuit 518 may determine whether a hard stall or soft stall has been detected based on BEMF signals from the BEMF circuit 510. Where the BEMF feedback circuit 518 does not detect a stall, the process 700 may proceed to operation 714 (where the stroke detection circuit 520 increases the step count) and back to operation 710. The process 700 may loop between operations 710-714 until a stall is detected by the BEMF feedback circuit 518. At each iteration, the motor control circuit 516 incrementally drives the motor in the first direction, and the stroke detection circuit 520 correspondingly incrementally increases the step count for the motor 508. When the BEMF feedback circuit 518 detects a stall based on signals from the BEMF circuit 510, the process 700 proceeds to operation 716.

At operation 716, the stroke detection circuit 520 computes a motor stroke. The motor stroke may be defined as a distance, range of motion, etc., in which the motor 508 is configured to move between end points. The motor stroke may be computed based on end points defined by BEMF signals from the BEMF circuit 510. For instance, the BEMF signal from the BEMF circuit 510 at one end of the motor stroke may be detected by the BEMF feedback circuit 516, and the BEMF signal from the BEMF circuit 510 at the other end of the motor stroke may be detected by the BEMF feedback circuit 516. The BEMF signals may be indicative of a hard or soft stall. The stroke detection circuit 520 may define the motor stroke based on the location of the motor 508 when the BEMF feedback circuit 516 detected the stalls (e.g., at the ends of the stroke). The stroke detection circuit 520 may count the number of steps (or half-steps, or other incremental movements of the motor 508 by the motor control circuit 516) in which the motor advanced between the ends. Thus, the stroke detection circuit 520 defines the motor stroke as the end points of the stroke (based on the BEMF signals) and the number of steps between the end points.

Figure 8:
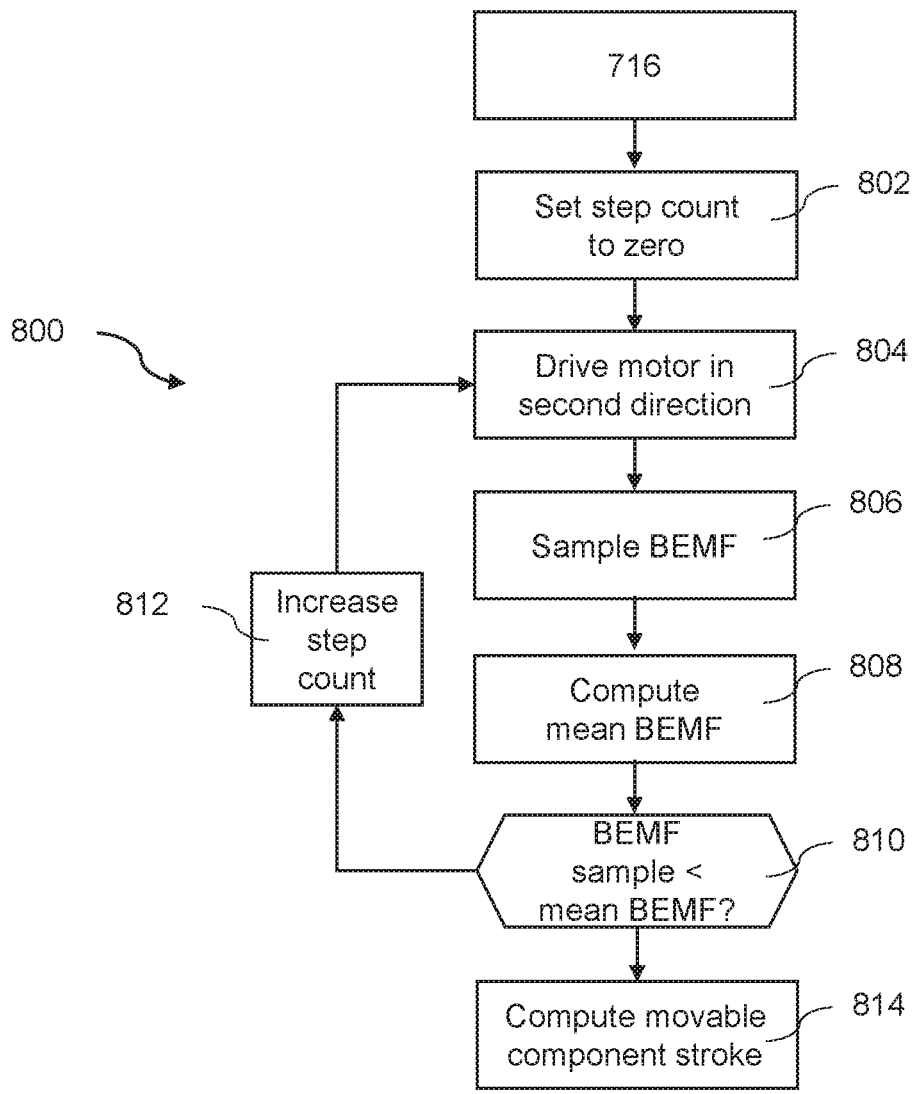
FIG. 8 is a flowchart of a process for detecting a stroke of the movable component of FIG. 5, according to an exemplary embodiment.

Referring now to FIG. 8, depicted is a flowchart of a process 800 for detecting a stroke of the movable component 504, according to an exemplary embodiment. In some embodiments, the process 800 may be performed in conjunction with (i.e., at the same time, shortly before or after, etc.) process 700. The process 800 may be performed by the various components and devices described above with reference to FIG. 5 and FIG. 6.

Figure 9A:
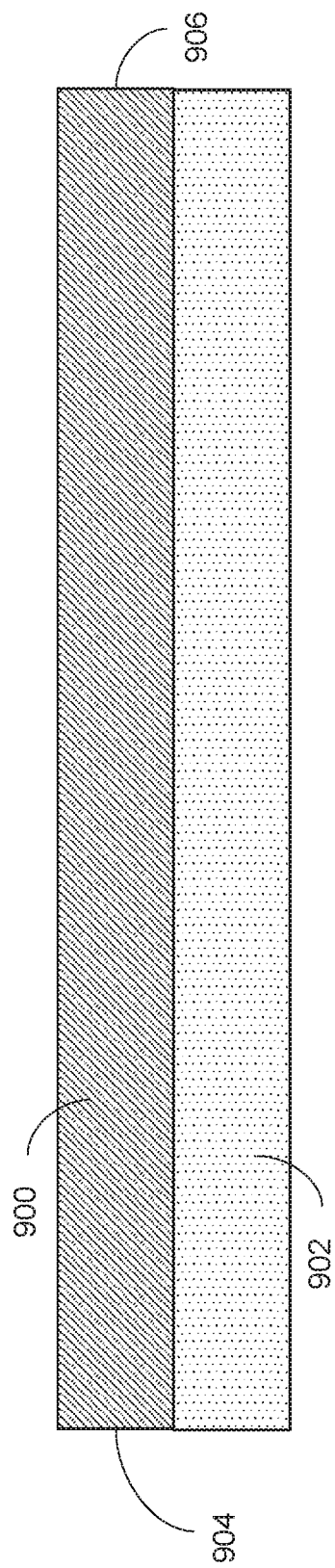
FIGS. 9A-9B are example representations of strokes for the motor and movable component, according to exemplary embodiments.
Figure 9B:
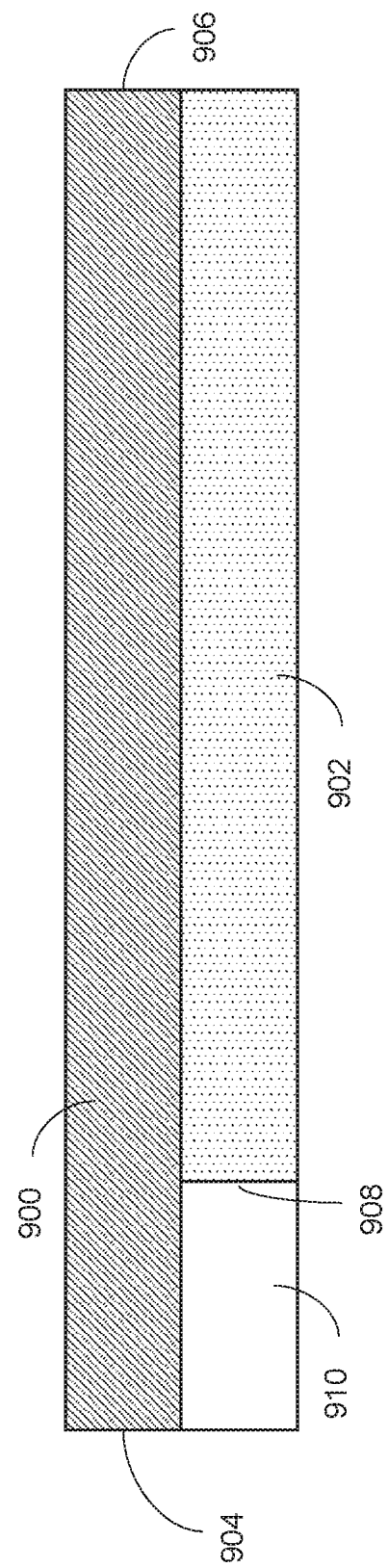

As shown in FIG. 8, the process 800 may proceed from operation 716 (e.g., of FIG. 7). At operation 716, the motor 508 may be positioned at one of the ends of the motor stroke described above. Referring to FIG. 9A and FIG. 9B, depicted are example representations of strokes for the motor 508 and movable component 504, according to exemplary embodiments. Each of the representations show a motor stroke 900 and movable component stroke 902. In the representation shown in FIG. 9A, the motor stroke 900 and movable component stroke 902 are substantially the same. Hence, the motor stroke 900 and movable component stroke 902 share substantially the same end points 904, 906. In the representation shown in FIG. 9B, the motor stroke 900 and movable component stroke 902 are different. As can be seen, the motor stroke 900 is larger (e.g., has a larger range of motion) than the movable component stroke 902. The movable component stroke 902 includes an end point 908 which is within the motor stroke 900. Thus, a gap 910 is present between the end point 904 of the motor stroke 900 and the end point 908 of the movable component stroke 902. As described above, the gap 910 may be present due to dead space of the movable component 504, a difference in a starting position of a stem of the movable component 504 which contacts the actuator 502 and an armature of the motor 508 of the actuator 502, mechanical tolerances, variances in construction or manufacture of the movable component 504, and so forth. At operation 716, the motor 508 may be positioned at end point 906. From operation 716, the process 800 may proceed to operation 802. At operation 802, the stroke detection circuit 520 sets the step count to zero. Operation 802 may be similar in at least some aspects to operation 708 of process 700. The process 800 may proceed to operation 804.

At operation 804, the motor control circuit 516 drives the motor in the second direction (e.g., away from the end point 906 towards end point 904). The motor control circuit 516 may drive the motor 508 step-by-step. The motor control circuit 516 may drive the motor 508 half-step-by-half-step. In each implementation, the motor control circuit 516 incrementally drives the motor 508 from the end point 906 in the second direction (e.g., towards the end point 904).

At operation 806, the BEMF feedback circuit 518 samples the BEMF. The BEMF feedback circuit 518 may sample the BEMF by identifying the BEMF signal(s) from the BEMF circuit 510. In some embodiments, operations 804 and 806 may be performed at substantially the same time. For instance, as the motor control circuit 516 drives the motor 508 in the second direction, the BEMF feedback circuit 518 may sample the BEMF by identifying the BEMF signal from the BEMF circuit 510.

At operation 808, the BEMF feedback circuit 518 may compute a mean BEMF for the motor 508. The mean BEMF may be an average BEMF across the motor stroke. As the motor 508 drives the movable component 504, the mean BEMF may be higher than instances where the motor 504 does not drive the movable component 504 because the movable component 504 may provide mechanical resistance to the motor 504 which is proportionally reflected in the BEMF. When the motor 508 does not drive the movable component 504 (for instance, where the motor stroke has a greater range of motion than the movable component stroke for the movable component 403), the BEMF is reduced to beneath the average.

At operation 810, the BEMF feedback circuit 518 determines whether the sampled BEMF (e.g., at operation 806) is less than the mean BEMF (e.g., computed at operation 808). The BEMF feedback circuit 518 may include a comparator which compares the sampled BEMF and mean BEMF. Where the sampled BEMF is greater than (or equal to) the mean BEMF, the process 800 proceeds to operation 812 (where the stroke detection circuit 520 increases the step count) and then back to operation 804. The process 800 may loop between operations 804-812 until the BEMF feedback circuit 518 samples BEMF which is less than the mean BEMF. At each iteration, the motor control circuit 516 incrementally drives the motor 508 in the second direction, and the stroke detection circuit 520 correspondingly incrementally increases the step count for the motor 508. When the BEMF feedback circuit 518 samples a BEMF which is less than the mean BEMF (indicating that the motor 508 is no longer driving the movable component 504), the process 800 proceeds to operation 814.

At operation 814, the stroke detection circuit 520 computes the movable component stroke 902. The movable component stroke 902 may be the portion of the motor stroke 904 in which the motor 508 actively controls the movable component 504. As such, the movable component stroke 902 may be an active range of the motor stroke 900 in which the motor 508 actively controls the movable component 504. The stroke detection circuit 520 may compute the movable component stroke 908 by first computing the gap 910, and subtracting the gap 910 from the motor stroke 900. The stroke detection circuit 520 may compute the movable component stroke 908 in a manner similar to calculating the motor stroke 900 (e.g., by identifying end points based on BEMF signals from the BEMF circuit 510 and adding the steps between end points). In either embodiment, the BEMF feedback circuit 518 may identify the end point 908 for the movable component stroke 908 based on the BEMF sampled by the BEMF feedback circuit 518 being less than the mean BEMF. In some embodiments, such as those where the motor 508 moves in the first direction from the end point 904 toward the end point 906, the BEMF feedback circuit 518 may identify the end point 908 by the sampled BEMF being greater than the mean BEMF (e.g., along the gap 910). In such embodiments, the process 800 may be modified or adapted based on such configurations. The stroke detection circuit 520 may compute the number of steps for the gap 910 following identification of the end points 906, 908 for the movable component 504.

Referring back to FIG. 5, the motor control circuit 516 may be configured to control the motor 508 to drive the movable component 504. The motor control circuit 516 may be configured to control the motor 508 for driving the movable component 504 based on data received from a controller (such as the BMS controller 366) operated by an operator, automatically operated, etc. The motor control circuit 516 may receive commands for controlling the movable component 504 from the controller, and the motor control circuit 516 may generate motor control signals for the motor 508 to correspondingly control the movable component. The motor control circuit 516 may control the motor 508 within the active range of the motor stroke 900 (e.g., within the movable component stroke 902). The embodiments described herein may provide for more precise control of the movable component 504 by the motor control circuit 516 being aware of the active range of the motor 504 in which the motor 504 actively controls the movable component 504. Through awareness of the active range, the motor control circuit 516 is also aware of the motor's 508 precise locations when the motor control circuit 516 communicates commands for controlling the motor 508.

In some embodiments, the BEMF feedback circuit 516 may monitor, sample, or otherwise receive BEMF signals from the BEMF circuit 510. The BEMF feedback circuit 516 may receive BEMF signals from the BEMF circuit 510 while the motor control circuit 516 controls the motor 508. In this regard, the BEMF feedback circuit 516 may monitor BEMF of the motor 508 as the motor 508 is driven to control the movable component 504. The BEMF feedback circuit 516 may monitor the BEMF of the motor 508 to determine whether the BEMF fits a profile of a properly functioning motor 508. The profile may be or include, for instance, an anticipated BEMF along the stroke of the motor 508. For instance, the profile may include the anticipated BEMF during start-up, ramp-up, steady-state, etc. As the motor control circuit 516 controls the motor 508, the BEMF feedback circuit 518 may compare the BEMF signals from the BEMF circuit 510 to the profile for the motor 508. The BEMF feedback circuit 518 may compare the BEMF signals to the profile to determine whether any conditions are present. For instance, where the sampled BEMF is different from the profile, the motor 508, movable component 504, or the environment in which the movable component 504/ motor 508 may have a condition which is causing the motor 508 and/or movable component 504 to stick. As one example, sediment buildup on the movable component 504 may cause the movable component to stick. Since the movable component 504 is sticking (thus not moving freely or as easily), the motor 508 may move slower, thus causing the BEMF to decrease in comparison to expected or anticipated BEMF.

The BEMF feedback circuit 518 may detect the condition based on the sampled BEMF in comparison to the profile for the motor 508. In some embodiments, the BEMF feedback circuit 518 may be configured to detect the condition when the BEMF trends toward zero BEMF (or beneath a threshold). The BEMF feedback circuit 518 may be configured to detect the condition based on a rate of change of the BEMF in comparison to a threshold. The BEMF feedback circuit 518 may be configured to detect the condition based on a difference between the expected position from input control signal (e.g., from the motor control circuit 516) and feedback signal from the BEMF circuit 510. The BEMF feedback circuit 518 may be configured to detect the condition based on a difference between the rate of change of the expected position from the input control signal (e.g., from the motor control circuit 516) and the feedback signal from the BEMF circuit 510. In each of these embodiments, the BEMF feedback circuit 518 may be configured to detect a sticking condition based on the detected BEMF and expected data.

Where the sampled BEMF is different (e.g., less than) the profile for the motor 508, the BEMF feedback circuit 518 may be configured to generate a signal which is communicated to the motor control circuit 516. The motor control circuit 516 may, in turn, generate various motor control signals for automatically addressing the sticking condition. For instance, the motor control circuit 516 may control the motor 508 to drive the movable component 504 back-and-forth at a high (or low rate) to remove sediment build-up. Where such automatic actions are successful, the motor control circuit 516, BEMF feedback circuit 518, and/or stroke detection circuit 520 may be configured to automatically identify the stroke of the actuator 502/movable component 504 (e.g., as described above). In instances where the automatic actions are unsuccessful, the BEMF feedback circuit 518 may generate a signal for a controller (such as the BMS controller 366). The signal may correspond to an alert which indicates the presence or existence of the sticking condition. The signal may be a DC signal, a PWM signal, etc., which is transmitted by the BEMF feedback circuit 518 to the controller. The controller may route the signal to a device for an operator (such as a client device 448). The operator may receive the alert of the condition, and the operator may address the condition. For instance, where the condition is a sticking condition, the operator may clean the motor 508 and/or movable component 504 to remove any sediment or build-up which is causing the sticking condition.

Figure 10:
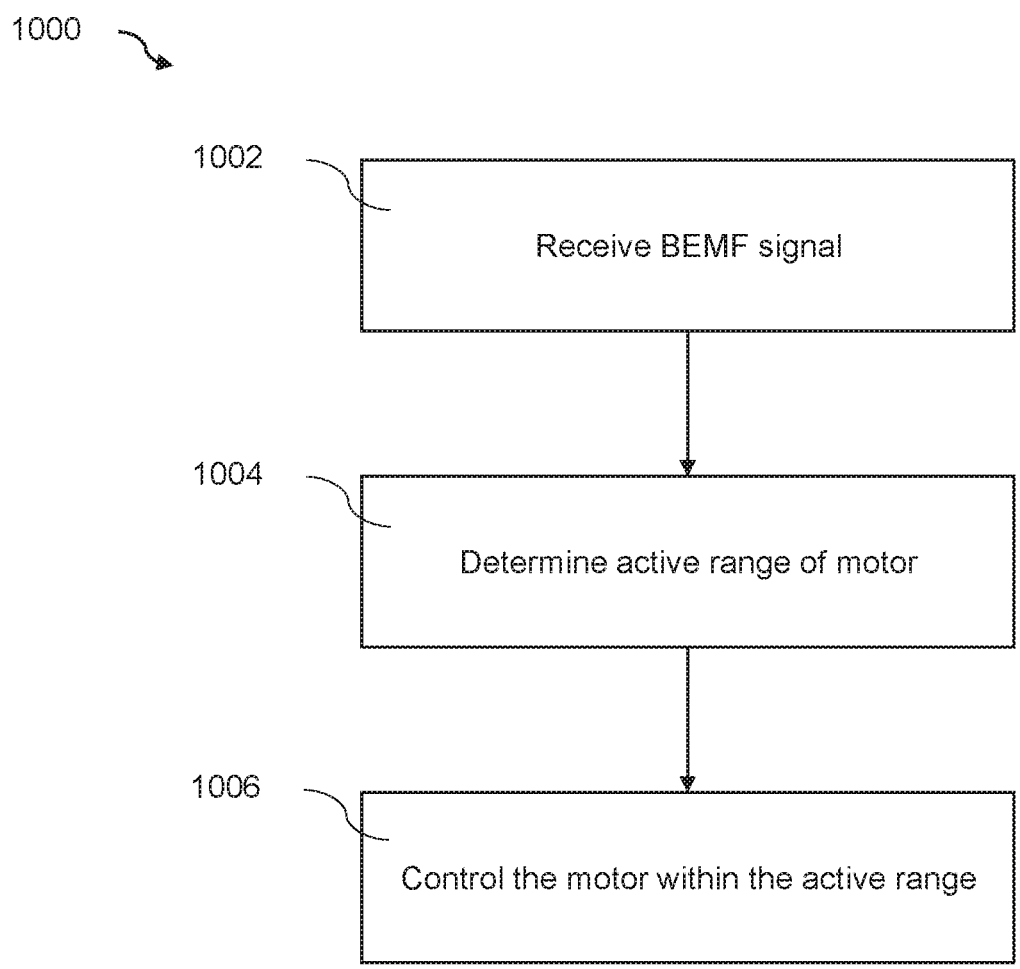
FIG. 10 is a flowchart of a process for BEMF-based feedback for a movable component in a building subsystem, according to an exemplary embodiment.

Referring now to FIG. 10, depicted is a flowchart showing a method 1000 for BEMF-based feedback. The method 1000 may be practiced by the components, elements, devices, and so forth described above with reference to FIGS. 1-6. The method 1000 may include or incorporate operations similar in some aspects to operations described above with reference to FIG. 7 and FIG. 8.

At operation 1002, the processing circuit 506 receives a BEMF signal from the BEMF circuit 510. As described above, the BEMF circuit 510 may be configured to measure a BEMF produced by a motor 508 in an actuator 502. The motor 508 may produce the BEMF while the motor 508 rotates. The BEMF may change based on whether the motor 508 drives the movable component 504 or whether the motor 508 is not driving the movable component 504 (e.g., the motor 508 is unloaded). The movable component 504 may control one or aspects of a system in a building (such as building 10). For instance, the movable component 504 may be a valve which is incorporated into various systems or subsystems a building 10, including, for instance, the HVAC system 100, waterside system 120, one of the building subsystems 428 which is controlled by the BMS controller 366, and so forth. The movable component 504 may be driven by the actuator 502 (e.g., the motor 508 of the actuator 502). The actuator 502 may be a damper actuator, a valve actuator, a fan actuator, a pump actuator, or any other type of actuator that may be used in one of the aforementioned systems or subsystems. The processing circuit 506 may receive the BEMF signal from the BEMF circuit 510 as the motor 508 drives the movable component 504. The processing circuit 506 may drive the motor 508. In some embodiments, the processing circuit 506 may drive the motor 508 to calibrate the motor 508. In some embodiments, the processing circuit 506 may drive the motor 508 during normal operation.

At operation 1004, the processing circuit 506 determines, based on the BEMF signal, an active range of the motor which corresponds to a full stroke of the movable component. The active range may be defined by end points for a stroke of the movable component 504 and the number of steps for the motor 508 between the end points.

In some embodiments, the processing circuit 506 may determine the active range by identifying a first end point corresponding to a position of the motor 508 as the motor 508 begins to drive the movable component 504. The position may be the position of the motor 508 at operation 716 of FIG. 7. The processing circuit 506 may determine the first end point by executing operations similar to (or the same as) those outlined in FIG. 7 leading up to operation 716. In some embodiments, the processing circuit may determine the end point by identifying a first stall position. The first stall position may be a hard stall position or a soft stall position. The hard stall position may be defined as a position in which the BEMF signal indicates zero BEMF. Hence, the motor 508 may be stopped. The soft stall position may be defined as a position in which the BEMF signal indicates a BEMF value between zero and a threshold BEMF value. The threshold BEMF value may be a value indicative of the motor 508 slowing down, approaching stopping, etc.

The processing circuit 506 may determine the active range by identifying a second end point based on a comparison of a mean BEMF to a sampled BEMF at the second BEMF end point. The processing circuit may identify the second end point as a position of the motor 508 when a sampled BEMF (e.g., from a BEMF signal) being less than a mean BEMF. The position may be the position of the motor 508 at operation 814 of FIG. 8. The processing circuit 506 may identify the second end point by executing operations similar to (or the same as) those outlined in FIG. 8 leading up to operation 814.

As described above, in some embodiments, the active range for the motor 508 may be the same as a full stroke of the movable component 504. In some embodiments, the active range of the motor 508 may span the range of motion of the motor 508. In such embodiments, one full stroke of the motor 508 may correspondingly implement one full stroke of the movable component 504. In some embodiments, the motor 508 has a range of motion which is larger than the active range of the motor 508. In such embodiments, a portion of the range of motion in which the motor 508 drives the movable component 504 corresponds to the active range.

At operation 1006, the processing circuit 506 controls the motor 508 to drive the movable component 504 within the active range (e.g., determined at operation 1004). The processing circuit 506 may generate motor control signal(s) for the motor 508 to drive the motor 508 within the active range such that the motor 508 drives the movable component 504. In other words, the processing circuit 506 may limit the amount by which the motor 508 is driven outside the active range. In some embodiments, the processing circuit 506 may drive the motor 508 to the end points (e.g., described above) and, following the motor 508 being located at the end points, the processing circuit 506 may control the motor 508 within the active range (e.g., determined at operation 1004) to correspondingly control the movable component 504. The processing circuit 506 may more precisely control the motor 508 (and correspondingly the movable component 504) through awareness of the active range of the motor 508.

In some embodiments, while the processing circuit 506 controls the motor 508 to drive the movable component 504 within the active range, the processing circuit 506 may identify a BEMF value which is less than an expected BEMF value corresponding to a profile for the motor 508. The processing circuit 506 may store a profile for the motor 508 which corresponds to expected BEMF values under various driving conditions and at various times. The processing circuit 506 may sample BEMF from the BEMF circuit 510 as the motor 508 drives the movable component 504. The processing circuit 506 may compare the sampled BEMF to an expected BEMF value from the profile. The processing circuit 506 may determine, based on the BEMF value being less than the expected BEMF value, that a condition is present for the movable component 504. The condition may be, for instance, a sticking condition caused by build-up on the movable component 504. The processing circuit 506 may generate a signal corresponding to an alert for communication to an operator which indicates the condition. The signal may be structured as a PWM signal, a DC signal, etc. In some embodiments, the processing circuit 506 may communicate the signal corresponding to the alert to a controller (such as the BMS controller 366), and the controller may transmit the alert to a client device 448 corresponding to the operator. The operator may then repair or otherwise address the condition.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the HVAC actuator and assembly thereof as shown in the various exemplary embodiments is illustrative only. Additionally, any element disclosed in one embodiment may be incorporated or utilized with any other embodiment disclosed herein. For example, the partial stroke test depicted in FIG. 16 may be executed by receiving instructions via the UART test system 1400, according to some embodiments, or may be executed by receiving instructions via the NFC device 518 according to some embodiments. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A system for controlling a movable component in a building system using back electromotive force-based feedback, the system comprising:
    an actuator operatively coupled to the movable component, the actuator comprising:
        a motor configured to drive the movable component; and a back electromotive force (BEMF) circuit configured to measure a BEMF produced by the motor while driving the movable component; and
a processing circuit communicably coupled to the motor and the BEMF circuit, the processing circuit comprising a processor and memory, the memory storing instructions that, when executed by the processor, cause the processor to perform operations comprising:
receiving, from the BEMF circuit, a BEMF signal generated by the BEMF circuit as the motor drives the movable component;
determining, based on the BEMF signal, an active range of the motor which corresponds to a full stroke of the movable component; and
controlling the motor to drive the movable component within the active range.

2. The system of claim 1, wherein determining the active range comprises:
identifying a first end point corresponding to a position of the motor as the motor begins to drive the movable component;
identifying a second end point based on a comparison of a mean BEMF to a sampled BEMF at the second end point; and
determining the active range, the active range being defined as spanning between the first end point and the second end point.

3. The system of claim 2, wherein identifying the first end point comprises identifying a hard stall position corresponding to the motor, the hard stall position being defined as a position in which the BEMF signal indicates zero BEMF.

4. The system of claim 2, wherein identifying the first end point comprises identifying a soft stall position corresponding to the motor, the soft stall position being defined as a position in which the BEMF signal indicates a BEMF value between zero and a threshold BEMF value.

5. The system of claim 1, wherein the active range of the motor is equal to the full stroke of the movable component.

6. The system of claim 1, wherein the motor has a range of motion larger than the active range of the motor.

7. The system of claim 1, wherein the operations further comprise:
identifying, while controlling the motor to drive the movable component within the active range, a BEMF value which is less than an expected BEMF value corresponding to a profile for the motor;
determining, based on the BEMF value being less than the expected BEMF value, that a sticking condition is present for the movable component; and
generating a signal corresponding to an alert for communication to an operator which indicates the sticking condition.

8. An actuator comprising:
a motor configured to drive a movable component configured to control one or more aspects of a system in a building;
a back electromotive force (BEMF) circuit configured to measure a BEMF produced by the motor while driving the movable component; and
a processing circuit communicably coupled to the motor and the BEMF circuit, the processing circuit comprising a processor and memory, the memory storing instructions that, when executed by the processor, cause the processor to perform operations comprising:
receiving, the BEMF circuit, a BEMF signal generated by the BEMF circuit as the motor drives the movable component;
determining, based on the BEMF signal, an active range of the motor which corresponds to a full stroke of the movable component; and
controlling the motor to drive the movable component within the active range.

9. The actuator of claim 8, wherein determining the active range comprises:
identifying a first end point corresponding to a position of the motor as the motor begins to drive the movable component;
identifying a second end point based on a comparison of a mean BEMF to a sampled BEMF at the second end point; and
determining the active range, the active range being defined as spanning between the first end point and the second end point.

10. The actuator of claim 9, wherein identifying the first end point comprises identifying a hard stall position corresponding to the motor, the hard stall position being defined as a position in which the BEMF signal indicates zero BEMF.

11. The actuator of claim 9, wherein identifying the first end point comprises identifying a soft stall position corresponding to the motor, the soft stall position being defined as a position in which the BEMF signal indicates a BEMF value between zero and a threshold BEMF value.

12. The actuator of claim 8, wherein the active range of the motor is equal to the full stroke of the movable component.

13. The actuator of claim 8, wherein the motor has a range of motion larger than the active range of the motor.

14. The actuator of claim 8, wherein the operations further comprise:
identifying, while controlling the motor to drive the movable component within the active range, a BEMF value which is less than an expected BEMF value corresponding to a profile for the motor;
determining, based on the BEMF value being less than the expected BEMF value, that a sticking condition is present for the movable component; and
generating a signal corresponding to an alert for communication to an operator which indicates the sticking condition.

15. A method for back electromotive force-based feedback, the method comprising:
receiving, from a back electromotive force (BEMF) circuit configured to measure a BEMF produced by a motor while a motor drives a movable component configured to control one or more aspects of a system in a building, a BEMF signal generated by the BEMF circuit as the motor drives the movable component;
determining, based on the BEMF signal, an active range of the motor which corresponds to a full stroke of the movable component; and
controlling the motor to drive the movable component within the active range.

16. The method of claim 15, wherein determining the active range comprises:
identifying a first end point corresponding to a position of the motor as the motor begins to drive the movable component;
identifying a second end point based on a comparison of a mean BEMF to a sampled BEMF at the second end point; and
determining the active range, the active range being defined as spanning between the first end point and the second end point.

17. The method of claim 16, wherein identifying the first end point comprises identifying one of a hard stall position and a soft stall position corresponding to the motor, the hard stall position being defined as a position in which the BEMF signal indicates zero BEMF and the soft stall position being defined as a position in which the BEMF signal indicates a BEMF value between zero and a threshold BEMF value.

18. The method of claim 15, wherein the active range of the motor is equal to the full stroke of the movable component.

19. The method of claim 15, wherein the motor has a range of motion larger than the active range of the motor.

20. The method of claim 15, further comprising:
identifying, while controlling the motor to drive the movable component within the active range, a BEMF value which is less than an expected BEMF value corresponding to a profile for the motor;
determining, based on the BEMF value being less than the expected BEMF value, that a sticking condition is present for the movable component; and
generating a signal corresponding to an alert for communication to an operator which indicates the sticking condition.

\* \* \* \* \*